(12) United States Patent
Kukalyekar et al.

(10) Patent No.: US 9,376,535 B2
(45) Date of Patent: Jun. 28, 2016

(54) BRANCHED POLYAMIDE WITH DIFFERENT BLOCKS

(75) Inventors: Nileshkumar Prakash Kukalyekar, Echt (NL); Zhujuan Wang, Echt (NL); Rudy Rulkens, Echt (NL); Godefridus Bernardus Wilhelmus Leonardus Ligthart, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 5 days.

(21) Appl. No.: 14/130,610

(22) PCT Filed: Jun. 25, 2012

(86) PCT No.: PCT/EP2012/062213
§ 371 (c)(1),
(2), (4) Date: Apr. 21, 2014

(87) PCT Pub. No.: WO2013/004531
PCT Pub. Date: Jan. 10, 2013

(65) Prior Publication Data
US 2014/0235798 A1      Aug. 21, 2014

(30) Foreign Application Priority Data
Jul. 1, 2011   (EP) .................................... 11005402

(51) Int. Cl.
| | |
|---|---|
| *C08G 69/28* | (2006.01) |
| *C08G 69/30* | (2006.01) |
| *C08G 69/36* | (2006.01) |
| *C08L 77/00* | (2006.01) |
| *C08G 81/00* | (2006.01) |
| *B29C 49/00* | (2006.01) |

(52) U.S. Cl.
CPC ............ *C08G 81/00* (2013.01); *B29C 49/0005* (2013.01); *C08G 69/28* (2013.01); *C08G 69/30* (2013.01); *C08G 69/36* (2013.01); *C08L 77/00* (2013.01)

(58) Field of Classification Search
None
See application file for complete search history.

(56) References Cited

U.S. PATENT DOCUMENTS

| | | | |
|---|---|---|---|
| 4,892,927 A | 1/1990 | Meyer | |
| 5,068,311 A * | 11/1991 | Horn et al. | ..................... 528/324 |
| 5,760,163 A | 6/1998 | Fisch et al. | |
| 6,566,486 B1 | 5/2003 | Joachimi et al. | |
| 2004/0030057 A1 | 2/2004 | Peduto et al. | |
| 2007/0060719 A1 | 3/2007 | Clement et al. | |

FOREIGN PATENT DOCUMENTS

| | | |
|---|---|---|
| GB | 1 226 944 | 3/1971 |
| WO | WO 2006/133968 | 12/2006 |
| WO | WO 2007/113262 | 10/2007 |

OTHER PUBLICATIONS

International Search Report for PCT/EP2012/062213, mailed Dec. 5, 2012.
Written Opinion of International Searching Authority for PCT/EP2012/062213, mailed Dec. 5, 2012.
International Standard ISO 307, "*Plastics-Polyamides-Determination of viscosity number*", Fifth Edition, Reference No. ISO 307:2007(E), May 15, 2007.
Nylon Plastics Handbook, Melvin I. Kohan, editor, ISBN I-56990-189-9, Sec. 2.3, p. 17 (1995).

* cited by examiner

*Primary Examiner* — Ana Woodward
(74) *Attorney, Agent, or Firm* — Nixon & Vanderhye P.C.

(57) ABSTRACT

The invention relates to a high molecular weight branched polyamide polymer comprising (a) blocks predominantly consisting of AA-BB repeat units, (b) blocks predominantly consisting of AB repeat units, and (c) branching units. The invention also relates to a process for the preparation of the high molecular weight branched polyamide polymer, comprising (1) a melt-mixing step wherein an essentially linear polyamide prepolymer (X-1), predominantly consisting of AA-BB repeat units, an essentially linear polyamide (pre) polymer (X-2), predominantly consisting of AB repeat units, and a branching agent are provided to and mixed and heated in a melt mixing apparatus, thereby forming a mixed melt, and the mixed melt being cooled, thereby forming a solid mixture; and (2) a solid state post condensation step wherein the solid mixture is post-condensed at elevated temperature in the solid state, thereby forming a high molecular weight branched polyamide polymer.

10 Claims, No Drawings

_US 9,376,535 B2_

BRANCHED POLYAMIDE WITH DIFFERENT BLOCKS

This application is the U.S. national phase of International Application No. PCT/EP2012/062213, filed 25 Jun. 2012, which designated the U.S. and claims priority to EP Application No 11005402.0, filed 1 Jul. 2011, the entire contents of each of which are hereby incorporated by reference.

The present invention relates to branched polyamides, a process for producing the branched polyamides and use of the branched polyamides in different applications. The invention in particular relates to branched AA-BB type polyamides, i.e. polyamides primarily based on diamines (AA type monomers) and dicarboxylic acids (BB type monomers).

According to the present invention, there are provided a branched prepolymer, a process for the production of the branched prepolymer, and a process wherein the branched prepolymer is used to prepare the branched polymer. The present invention further provides processes for the use of the branched polyamides obtained therefrom in shaping processes and applications such as, for example, injection moulding, extrusion, extrusion blow moulding, suction blow moulding and thermoforming.

Polymers used in extrusion blow moulding and suction blow moulding should be easily processable meanwhile exhibiting very high melt viscosities at low shear rates. Generally, branched polymers are used herein. Such polymers should be producible on industrial scale in an economical and preferably readily controllable manner in a short reaction time and under mild conditions.

Polyamides are a class of polymers which have proven successful for many years. They are characterised in particular by easy processability, very good mechanical properties, very good electrical properties, elevated heat resistance, good resistance to chemicals and very good surface quality.

Polyamides may be produced using various processes and be synthesised from very many different units and, alone or in combination with processing auxiliaries, stabilisers, polymeric alloying components (for example elastomers) or also reinforcing materials (such as for example mineral fillers or glass fibres), and can be provided with specific combinations of properties to yield materials for specific applications. The large number of possible combinations makes it possible to create a very large number of products having a large variety of properties. See for example Becker G. W., Braun D. *Kunststoff Handbuch* 3/4 *Polyamide*; Hanser Verlag; München/Wien, 1998.

Numerous processing methods are known for the production of polyamides, wherein, depending upon the desired finished product, different monomer combinations, and various chain-transfer agents and/or monomers having reactive groups for subsequently planned post-treatments are used to establish the desired molecular weight.

Industrially significant processes for the production of polyamides proceed by melt polycondensation. However, due to the very rapid increase in melt viscosity which accompanies a rise in molecular weight, these processes are generally applied only for relatively low molecular weight products, as an excessively high melt viscosity gives rise to various problems. Temperature control and removal of the water of reaction accordingly become increasingly difficult, while the long reaction time at the elevated temperatures which are required results in more extensive secondary reactions and gel particle formation, which may dramatically impair the quality of the final product.

Solid phase post-condensation (SPPC) here provides decisive advantages. Due to the generally far lower reaction temperatures (approx. 150 to 230° C., in comparison with 250 to 300° C. in the case of melt condensation) and due to the semi crystalline nature of the polymeric material the risk of unwanted secondary reactions and gelation is reduced. Since the material to be subjected to post-condensation comprises defined particles having an interstitial volume, it is not problematic to maintain a uniform reaction temperature and to remove the residual water. However, the achievable molecular weight is limited with SPPC too, as the viscosity values of the products level out to a maximum value plateau as can be learned from C. D. Papaspyrides, S. T. Vouyiouka, Solid state polymerization, Wiley 2009, p. 50. While the height of this viscosity plateau may indeed be raised by increasing the temperature, such an increase then in turn gives rise to problems such as secondary reactions and gelation.

Production of large tubes by extrusion or hollow mouldings by extrusion blow moulding or suction blow moulding (for example automotive ventilation tubes or tanks or automotive intake manifolds) require polymer composition with a high melt viscosity and relative high melt stability compared to other processes like injection moulding processes.

A manner to obtain polyamides with higher viscosity at low shear rates is by using polyfunctional compounds, such as tri- and tetrafunctional carboxylic acids or amines, which act as branching agents. Branching is often used in polymers with regular molecular weights, to increase the flowability of the polymers. However, with the increase in the amount of branching agent and increase in viscosity, there is also an increased tendency to gel formation. This is why special measures or procedures have to be taken to obtain a branched polymer with the right properties.

Polyamides that exhibit less a problem of gel formation are lactam based polyamides, also known as AB type polyamides. Using only either polyfunctional compounds with amine functional groups, or polyfunctional compounds with carboxylic acid functional groups, results merely in star burst type of polymers with either amine end groups, or alternatively carboxylic end groups, with a single branching point. To achieve a higher branching degree, often chain extenders, such as difunctional amines or dicarboxylic acids, are used, in combination with chain stoppers, such mono functional amines or monocarboxylic acids. The components have to be balanced properly to achieve a high viscosity with a high degree of branching and no crosslinking of gelation.

The aim of the present invention is to provide a high molecular weight branched polyamide that can be used in suction blow moulding, and a process for its production that does not have the above problems or in less extent.

This aim has been achieved with the process according to the invention. The process according to the invention is an at least two-stage process, comprising a melt-mixing step and a solid state post-condensation step. The process according to the invention comprises (1) a melt-mixing step wherein
  an essentially linear polyamide (pre)polymer (X-1), predominantly consisting of AA-BB repeat units,
  an essentially linear polyamide (pre)polymer (X-2), predominantly consisting of AB repeat units
  a branching agent,
  and optionally other components (Z)
  are provided to and mixed and heated in a melt mixing apparatus, thereby forming a mixed melt, and the mixed melt being cooled, thereby forming a solid mixture;
and
(2) a solid state post condensation step wherein the solid mixture is post-condensed at elevated temperature in the solid state, thereby forming a high molecular weight branched polyamide polymer.
wherein
- the (pre)polymers (X-1) and (X-2) are provided in a weight ratio (X-1)/(X-2) in the range of 0.25-4;
- the (pre)polymer (X-1) and/or the (pre)polymer (X-2) have a viscosity number (VN), measured according to ISO 307, in the range of 50-250 mL/g,
- the branching agent is a branched polyamide oligomer/prepolymer (Y) comprising a branching unit derivable from a monomer (referred to as monomer C) having at least three functional groups being either amino groups and/or carboxylic acid functional groups or precursor groups thereof, and optionally AA-BB and/or AB repeat units;
- the branching unit is present in an amount in the range of 0.05-1 mole %, relative to the total moar amount of AA repeat units, BB repeat units AB repeat units and the branching units;
- the high molecular weight branched polyamide polymer obtained after the solid state post condensation has a relative viscosity (RV) measured according to ISO 307 of at least 2.5.

The effect of the process according to the present invention is that the resulting branched polyamide has improved melt stability and improved moulding characteristics compared to a similar branched polyamide prepared from the essentially linear polyamide (pre)polymer (X-1) and the branching agent, without the presence of the essentially linear polyamide (pre)polymer (X-2). The branched polyamide so produced from the (pre)polymers (X-1) and (X-2) and branching agent also has better thermal properties, than for example a branched polyamide with a similar composition but prepared from a random AA-BB/AB copolyamide (pre)polymer with overall the same composition as the combination of (X-1) plus (X-2).

The effect of the process according to the present invention is further that a homogeneous mixture is obtained rather easily, a branched polyamide with a high viscosity is obtained in a controllable manner in a wide range of compositions without gel formation even when end-group functionalities are not off-balance and/or not blocked with chain stoppers, and no unreacted branching agent has to be extracted.

The mixing of the components in step 1 of the process can be done, for example in a twin screw extruder.

In the process according to the present invention, the branching agent is a branched polyamide oligomer/prepolymer (Y). The branching agent comprises a branching unit derivable from a multifunctional monomer (referred to as monomer C) having at least three functional groups being either amino groups and/or carboxylic acid functional groups or precursor groups thereof. The branched polyamide oligomer/prepolymer (Y) suitably comprises other monomeric repeat units being either AA/BB repeat units and/or AB repeat units. Preferably, the branched polyamide oligomer/prepolymer (Y) predominantly consisting of AA-BB repeat units and branching units.

The term "oligomer/prepolymer" as used herein for the branching agent is herein understood to be either an oligomer or a prepolymer. An oligomer generally consists of a limited number of repeat units and typically has a rather low molecular weight, and is typically characterised by a very low viscosity in the melt. A prepolymer may have a higher molecular weight, but the molecular weight of a prepolymer is typically still too low for moulding applications and similar purpose. A prepolymer generally has a rather low viscosity in the melt.

The term "(pre)polymer" is herein understood to be either a prepolymer or a polymer. A prepolymer is characterised by a relative low viscosity in the melt and relative low molecular weight, whereas a polymer can have a medium to high molecular weight, and corresponding medium to high viscosity in the melt.

The essentially linear polyamide (pre)polymer (X-1), consisting predominantly of AA and BB repeat units, and the preferred embodiment of the branched polyamide oligomer/prepolymer (Y), consisting predominantly of AA and BB repeat units and branching units, may comprise repeat units derived from other components. However, the content of such other units is generally less than 40 mole %, relative to the total molar amount of AA and BB repeat units in said (pre)polymer, respectively to the total molar amount of AA and BB repeat units and branching units in said oligomer/prepolymer. Preferably, the content of such other units is generally less than 20 mole %, relative to the total molar amount of AA and BB repeat units, respectively to the total molar amount of AA and BB repeat units and branching units.

The essentially linear polyamide (pre)polymer (X-2), consisting predominantly of AB repeat units, may comprise repeat units derived from other components. However, the content of such other units is generally less than 20 mole %, relative to the total molar amount of AB repeat units in said (pre)polymer.

Although the essentially linear polyamide (pre)polymers (X-1) and (X-2) and the branched polyamide oligomer/prepolymer (Y) may each be off-balance in end groups, e.g. excess in amine functional end groups (AFE) or excess in carboxylic functional end groups (CFE), the process is readily performed with each of the linear polyamide (pre)polymer (X-1) and the branched polyamide oligomer/prepolymer (Y) being in balance in end groups, or nearly so, i.e. each having more or less equal number of carboxylic functional end groups (CFE) and number of amine functional end groups (AFE). This not only allows for a faster post condensation process, but also allows a wider variation in mixing ratio between X and (Y) without the need to adapt the composition of each of them, and also results in reaching a high viscosity in a relative short time.

In stead of the term "end group" also the term "terminal group" is used. The amounts of amino terminal groups and/or acids are determined by potentiometric titration after dissolution of the polyamide. A method is described for example in "Encyclopaedia of Industrial Chemical Analysis", volume 17, page 293, 1973.

In a preferred embodiment of the process according to the present invention, the branched polyamide oligomer/prepolymer (Y) is a branched polyamide oligomer or prepolymer obtained or obtainable by polymerization of a polyamide forming monomer mixture, comprising repeat units derived from a monomer mixture comprising (A) a first monomer (referred to as monomer A) having two amino functional groups, and (B) a second monomer (referred to as monomer B) having two carboxylic acid functional groups or precursor groups thereof;

and/or a salt of A and B, and (C) a third monomer (referred to as monomer C) having at least three functional groups being either amino groups and/or carboxylic acid functional groups or precursor groups thereof, wherein the repeat units are present in a molar amount according to formula I and II:

$$Q=(MC*FC)/(MA+MB) \quad \text{(Formula I)}$$

and $$R=((MA*2)+(MC*FCA))/((MB*2)+(MC*FCB)) \quad \text{(Formula II)}$$

wherein
  MA, MB and MC represent the molar amounts of repeat units derived from the monomers A, B and C, respectively;
  FC represent the functionality of monomer C, and is equal to FC-A+FC-B;
  FC-A is the number of the amino functional groups comprised by monomer C;
  FC-B is the number of carboxyl functional groups or precursor groups thereof comprised by monomer C;
  Q is a number in the range of 0.06-1.00; and
  R is a number in the range of 0.7-1.3;
and
wherein the branched polyamide oligomer/prepolymer has a viscosity number (VN), measured according to ISO 307, in the range of 7-30 mL/g.

The advantages of the branched polyamide oligomer/prepolymer (Y) according to the preferred embodiment are in the process for the preparation of the polymer: a branched polyamide with a high viscosity is obtained in a controllable manner in a wide range of compositions without gel formation even when end-group functionalities are not off-balance and/or not blocked with chain stoppers; the melting point of the precursor is higher and volatility is lower than the starting monomer C. Thus a solid material can be added during extrusion, which does not provide problems of stickiness or flashing off. The oligomer/prepolymer can be added in a more controlled manner and can simply be blended with other (pre)polymers for making high Mw branched polyamides with reduced risk of gel formation and without the need to correct the end group balance or to correct with monofunctional monomers.

Preferably, the number Q is in the range of 0.10-0.75; more preferably 0.15-0.60. A low value for Q might be used but results in longer post condensation times in second step to reach high a high Mw for the target branched polyamide polymer. A high value for Q may be used, but makes the process more critical in respect of gel formation. The optimum is to have a number Q with a value in the range of better 0.24-0.45.

The branched polyamide oligomer/prepolymer (Y) according to the preferred embodiment is prepared from a monomer mixture such that the amount of co-reacting groups, i.e. amino groups and carboxylic acid groups or precursors thereof, is in-balance or not far off-balance. Though one type of group can be in excess of the other, the excess is limited by the boundary levels set for R.

The ratio between amine functional groups and carboxyl functional groups, or precursors thereof, as represented by R in formula II, may be such that there is an excess of carboxyl functional groups or amine functional groups. Preferably this excess is limited, such that R is in the range of 0.8-1.25, better 0.9-1.2. This allows the oligomer/prepolymer to be prepared with a higher molecular weight. Most preferably, the ratio R is in the range of 0.95-1.1, i.e. the end groups are about in balance or there is a small excess of amine groups. This has the advantage that the acid and amine functionalities are more in balance to increase molecular weight in the next process step.

The branched polyamide oligomer/prepolymer (Y) according the preferred embodiment described above has a viscosity number (VN), measured according to ISO 307, in the range of 7-30 mL/g. Suitably, the VN of the oligomer/prepolymer is in the range of 10-25 mL/g, or even better 13-18 mL/g. A higher VN has the advantage that the oligomer/prepolymer has a higher melting point, a lower VN has the advantage that the oligomer/prepolymer can comprise more branching agent.

The viscosity number (VN) according to ISO 307 as mentioned herein for the branched oligomer/prepolymer is measured on a polymer solution of polyamide at a concentration of 5 gram of polymer in 100 ml of either sulphuric acid 96.00±0.15% m/m or formic acid 90.00±0.05% at 25.00±0.05° C. Formic acid is used for fully aliphatic polyamides. Sulphuric acid is used for polyamides comprising aromatic groups.

The branched polyamide oligomer/prepolymer (Y) according to the preferred embodiment can have a number average molecular weight (Mn) varying over a wide range, as long as the VN stays with the indicated range. Suitably, the Mn of the oligomer/prepolymer is in the range of 600-3500 g/mol, for example in the range 800-3000 g/mol, or more particularly 1000-2000 g/mol.

The number average molecular weight (Mn) referred to herein is determined by size-exclusion chromatography (SEC) combined with different detectors. The SEC-system consisted of three PFG Linear XL columns (300 mm×8 mm ID) supplied by Polymer Standards Service, operating at 0.4 ml/min and thermostatted at 35° C. For the measurements, a refractive index detector (RI), a viscometer and a right-angle laser-light scattering detector was used and molar masses were calculated using these triple detector signals to yield molar-masses. The injection volume was 75 μl. Hexafluoroisopropanol with 0.1% (w/w) potassium trifluoro acetate was used as eluent. All samples were filtered over a 0.1 μm filter before injection.

In order to prevent crosslinking in the oligomer/prepolymer, which is relatively high in content in crosslinking agent, the polymerization of the oligomer/prepolymer is stopped far before completion of the polyamide formation reaction. As a result the oligomer/prepolymer is generally characterized by the presence of both amino functional end groups and carboxylic acid functional end groups, i.e. amino functional end groups and carboxylic acid functional end groups and are present next to each other.

Preferably the branched polyamide oligomer/prepolymer (Y) according to the preferred embodiment has carboxylic acid functional end groups and amino functional end groups, wherein the ratio (REG) between the number of the amino functional end groups (NEG-A) and the number of carboxyl functional end groups (NEG-B) in the oligomer/prepolymer is in the range of 0.5-2.0. Preferably REG is in the range of 0.7-1.6 (preferably 0.8-1.4, or even better 0.9-1.2. I.e. there is a preference for a balanced ratio or a slight excess of amines, for faster build up of molar mass in the next step of the polymerization process.

Monomer A used for the branched polyamide oligomer/prepolymer (Y) is a diamine. Monomer A can be any diamine that is suitable for making polyamides. The monomer A can be, for example, an aliphatic diamine, linear or branched, a cyclo-aliphatic diamine, an aromatic diamine or any mixture thereof. The aliphatic diamine may also be an aliphatic-aromatic diamine, such as m-xylylene diamine. Preferably, the diamine is an aliphatic diamine, which may be linear or branched, more preferably having 4-12 C atoms. Examples of suitable aliphatic diamines are 1,4-diaminobutane (or butanediamine), 1,6-diaminohexane (or hexamethylenediamine), 2-methylpentamethylenediamine, 1,8-diaminooctane, 3,3',5-trimethyl hexamethylenediamine, 1,8-,2-methyloctanediamine, 1,9-nonadiamine, 1,10-diaminodecane, 1,12-diaminododecane. Examples of suitable cyclo-aliphatic diamine is 1,4-cyclohexane diamine and isophorone diamine.

Monomer B used for the branched polyamide oligomer/prepolymer (Y) can be any dicarboxylic acid, or precursor thereof, that is suitable for making polyamide. Esters like alkyl ester and acid chloride derivatives of carboxylic acids are suitable precursors of carboxylic acids as these can react with amines to form amide groups. Generally, such dicarboxylic acids will include saturated aliphatic dicarboxylic acids and aromatic dicarboxylic acids, although unsaturated dicarboxylic acids may also be used. Examples of suitable saturated aliphatic dicarboxylic acids ethanedioic acid (also known as succinic acid), pentanedioic acid (glutaric acid), hexanedioic acid (adipic acid), heptanedioic acid (pimelic acid), octanedioic acid (suberic acid), nonanediocic acid (azeleic acid), decanedioic acid (sebacic acid), undecanedioic acid, dodecanedioic acid etc. Aromatic dicarboxylic acids that can be used, are, for example, isophthalic acid and terephthalic acid. Examples of suitable cylcoaliphatic dicarboxylic acids are 1,3-cyclohexanedicarboxylic acid and 1,3-cyclohexanedicarboxylic acid. Examples of unsaturated dicarboxylic acids are pent-2-enedioic acid and dodec-2-enedioic acid. As dicarboxylic acid monomer can be mentioned in particular aliphatic or aromatic carboxylic diacids having 4 to 12 carbon atoms, such as adipic acid, terephthalic acid, isophthalic acid, pimelic acid, suberic acid, sebacic acid, dodecanedioic acid. Preferably, monomer B is a dicarboxylic acid chosen from adipic acid, terephthalic acid and isophthalic acid, or an ester or acid chloride derivative thereof, and any mixture thereof.

The diamine monomers (A) and dicarboxylic acid monomers (B) may be used in any combination. These include those conventionally used for manufacturing the following polyamides, but not limited thereto: aliphatic-type polyamides such as PA 6.6, PA 6.10, PA 6.12, PA 12.12, PA 4.6, and semi-aromatic polyamides including poly-m-xylylenediamine adipate (PA-MXD6), polyterephthalamides, such as PA 6.T, PA 9.T and PA6.6/6T, and polyisophthalamides, such as PA66/6I, or their copolymers. The monomers may be optionally combined in the form of salts of dicarboxylic acids and diamine monomers.

For the monomer C to be used as branching agent in the branched polyamide oligomer/prepolymer (Y) according to the invention, in principle any compound having three or more functional groups that can react with other groups thereby forming amide groups can be used. The functional groups can be either amine groups, or carboxylic acid functional groups or precursor groups thereof, or a combination thereof. Thus monomer C should have at least three amine groups, or at least three carboxylic acid functional groups or precursor groups thereof, or at least one amine group and at least two carboxylic acid functional groups or precursor groups thereof, or at least two amine groups and at least one carboxylic acid functional group or precursor group thereof. Suitably, monomer C is a compound with three or more amino functional groups or a compound with three or more carboxylic acid functional groups.

Preferably, monomer C is a three functional compound with identical functional groups, i.e. a tris-amino functional compounds or a three functional carboxylic acid compound or precursor thereof.

The multifunctional compound may include a core part bearing the functional groups, which corer part can be in particular cyclohexyl, cyclohexanoyl, benzyl, naphthyl, anthracenyl, biphenyl, a triphenyl pyridine, bipyridine, pyrrole, indole, furan, a thiophene, a purine, quinoline, a phenanthrene, a porphyrin, a phthalocyanine, a naphthalocyanine, a 1,3,5-triazine, a 1,4-diazine, a 2,3,5,6-tetraethylpiperazine, a piperazine, and/or tetrathiafulvalene.

Examples of suitable multifunctional compounds bearing four carboxylic acid functions, include 2,2,6,6-tetra-(beta-carboxyethyl)cyclohexanone, diaminopropane-N,N,N',N'-tetraacetic acid, 3,5,3',5'-biphenyltetracarboxylic acid, 3,5,3',5'-biphenyltetracarboxylic acid, 1,3,5,7-naphthalenetetracarboxylic acid, 3,5,3',5'-bipyridyltetracarboxylique acid, 1,3,6,8-achdinetetracarboxylique acid, and 1,2,4,5-benzenetetracarboxylic acid. Examples of suitable three functional carboxylic acid compounds or precursor thereof are 2,4,6-pyridinetricarboxylique acid and trimesic acid (benzene-1,3,5-tricarboxylic acid).

As examples of multifunctional compounds bearing amine functions can be mentioned melamine; tris(aminoalkyl) amines, such as tris(aminoethyl)amine (TAEA); polyalkylenetriamines, such as for example Jeffamine T (R) Huntsman, including Jeffamine T403 (R) (polyoxypropylenetriamine); and dialkylenetriamines, such as diethylenetriamine (DETA), bis(hexamethyene)triamine (BHT), and 4-aminomethyl-1,8-octanediamine. Examples of suitable tris-amino functional compounds are bis(hexamethyene)triamine (BHT), diethylenetriamine and combinations thereof.

Particularly preferably the tris-amino functional compounds comprises bis(hexamethyene)triamine (BHT) and/or diethylenetriamine (DETA), more preferably bis(hexamethyene)triamine (BHT).

Preferably, the branched polyamide oligomer/prepolymer (Y) and the branched polyamide polymer of the invention based there upon is obtained by polymerization of monomers dicarboxylic acids and diamines or their salts, and a single type of multifunctional compounds (C). More preferably, monomer C comprises or even consists of a polyamino functional compound, still more preferably a tris-amino functional compound.

The branched polyamide oligomer/prepolymer (Y) according to the preferred embodiment may comprise repeat units derived from monomers other than monomers A, B and C in an amount of at most 40 mol %, relative to the total molar amount of A, B and C (i.e. MA+MB+MC).

Preferably the amount of monomers other than monomers A, B and C is at most 20 mol %, even better at most 10 mol %, and still better in the range of 0-5 mol %, if used at all. Such other monomers can be, for example, αω-amino acids, or their cyclic lactam derivatives thereof, (together also denoted as AB monomers, and resulting in AB repeat units), and monofunctional compounds, such as monofunctional amines or monofunctional carboxylic acids. A suitable lactam derivative is, for example, caprolactam. If one would use large amount of other monomers such as lactams, in combination with monomer C, and less diamines (monomer A) and dicarboxylic acids (monomer B), which result in AA-BB repeat units, it becomes more difficult to get a branched polymer with shows sufficient shear thinning. However, in particular the amount of monofunctional compounds, which can act as chain stopper, shall be limited and preferably is at most 5 mol %.

Suitable compositions for the branched polyamide oligomer/prepolymer (Y) according to the preferred embodiment, are for example, but mot limited thereto, oligomer/prepolymers comprises 25-50 mole % 1,4-diaminobutane, 40-60 mole % adipic acid, and 2.5-25 mole % bis(hexamethyene) triamine (BHT) and has an Mn, measured by SEC, in the range of 600-3500 g/mol.

In this example the amount of 1,4-diaminobutane may well be chosen in a more narrow range, for example 30-49 mole %, or even 35-45 mole %. Likewise, the amount of adipic acid may be chosen in a more narrow range, for example 45-55 mole %, or even 49-41 mole %. Also the amount of bis (hexamethyene)triamine (BHT) well be chosen in a more narrow range, for example 4-20 mole %, or even 5-15 mole %.

Other suitable compositions for the branched polyamide oligomer/prepolymer (Y) according to the invention, are for example, but mot limited thereto, oligomer/prepolymers comprising 25-50 mole % adipic acid, 40-60 mole % 1,4-diaminobutane, and 2.5-25 mole % three functional carboxylic acid compound, for example trimesic acid, and has an Mn, measured by SEC, in the range of 600-3500 g/mol.

Also in this example, the amount of adipic acid may well be chosen in a more narrow range, for example 30-49 mole %, or even 35-45 mole %. Likewise, the amount of 1,4-diaminobutane may be chosen in a more narrow range, for example 45-55 mole %, or even 49-41 mole %. Also the amount of the three functional carboxylic acid compound may well be chosen in a more narrow range, for example 4-20 mole %, or even 5-15 mole %.

In these examples 1,4-diaminobutane may be replaced by other diamines, or by mixtures of diamines, e.g. mixtures of 1,4-diaminobutane with other diamines. Analogously, adipic acid may be replaced by other dicarboxylic acids, or by mixtures of dicarboxylic acids, e.g. mixtures of adipic acid with other dicarboxylic acids. Also bis(hexamethyene)triamine (BHT) respectively trimesic may be replaced by or combined with other polyfunctional diamines, respectively polyfunctional carboxylic acid compounds.

The above described branched polyamide oligomer/prepolymer (Y), and the various embodiments and examples thereof can be prepared by the process, comprising the steps of:

(I) preparing a monomer mixture comprising
  (A) a first monomer (referred to as monomer A) having two amino functional groups, and
  (B) a second monomer (referred to as monomer B) having two carboxyl acid functional groups or precursor groups thereof,
  and/or a salt of A and B, and
  (C) a third monomer (referred to as monomer C) having at least three functional groups, being either amino groups and/or carboxylic acid functional groups or precursor groups thereof,
  wherein
    1. the functional groups of monomer A and monomer B can react with each other to form amide groups, and the functional groups of monomer C can react with either the functional groups of monomer A and/or the functional groups of monomer B to form amide groups,
    2. the monomers are present in molar amounts according to formula I and II:

$Q = (MC \cdot FC)/(MA + MB)$  (Formula I)

and $R = ((MA \cdot 2) + (MC \cdot FCA))/((MB \cdot 2) + (MC \cdot FCB))$  (Formula II)

wherein
  MA, MB and MC represent the molar amounts of repeat units derived from the monomers A, B and C, respectively;
  FC represent the functionality of monomer C, and is equal to FC-A+FC-B;
  FC-A is the number of the amino functional groups comprised by monomer C;
  FC-B is the number of carboxyl functional groups or precursor groups thereof comprised by monomer C;
  Q is a number in the range of 0.06-1.00; and
  R is a number in the range of 0.7-1.3;

(II) heating the monomer mixture thereby inducing a reaction between the monomers resulting in polymerization of the monomers through amide formation;

(III) keeping the monomer mixture at elevated temperature until a polyamide oligomer/prepolymer having a viscosity number (VN), measured according to ISO 307, in the range of 7-30 mL/g is obtained;

and (IV) cooling the oligomer/prepolymer.

The viscosity number (VN) mentioned herein is measured as described further above.

The advantages of this process reside in the branched polyamide oligomer/prepolymer so prepared and the use thereof in the process to prepare a high Mw branched polyamide, which advantages have already been described above.

The specific and preferred embodiments of the above process for preparing the branched polyamide oligomer/prepolymer are directly related to the specific and preferred embodiments of the branched polyamide oligomer/prepolymer (Y) described above. The process can be modified accordingly.

The polymerization process for preparing the oligomer/prepolymer (Y) can be executed by employing conventional operating conditions of polymerization of dicarboxylic acids and diamines, as when it is performed for the preparation of oligomer/prepolymers in the absence of multifunctional compounds. Such a polymerization process can comprise briefly: a stirring and heating under pressure of the mixture of monomers and multifunctional compounds, maintaining the mixture under pressure and temperature for a fixed period, with removal of water vapour by an appropriate device. This can be followed by release of the reactor content by flashing, thereby removing the remaining water and cooling the oligomer/prepolymer. Thus the oligomer/prepolymer can be obtained in solid powder form.

It is perfectly possible to add at the beginning, during or after the polymerization additives, such as for example catalysts, such as phosphorus catalysts, anti-foaming agents and stabilizers to light or heat. During the removal of water vapour some diamine may be removed as well. It might therefore be advantageous to add some excess diamine at the beginning of the polymerization, or to supplement some extra diamine during the polymerization, in order to achieve the oligomer/prepolymer with the desired composition.

The essentially linear polyamide (pre)polymer (X-1), also referred to as linear (pre)polymer (X-1), or in abbreviated form as (X-1), used in the polymerization process according to the invention for making the high molecular weight branched polyamide polymer, predominantly consists of AA-BB repeat units. In other words the linear (pre)polymer (X-1) is a polyamide (pre)polymer obtainable by polymerization of a polyamide forming monomer mixture comprising predominantly (A) a first monomer (referred to as monomer A) having two amino functional groups, and (B) a second monomer (referred to as monomer B) having two carboxylic acid functional groups or precursor groups thereof, and/or a salt of A and B.

As for the branched oligomer/prepolymer (Y) described further above, precursor groups of carboxylic acid functional groups are functional groups that, like carboxylic acid functional groups, can react with an amine functional group to form an amide bond.

The monomers A and monomers B, and preferred selections thereof that can be used for the linear (pre)polymer (X-1) are the same as described further above for the branched oligomer/prepolymer (Y). Suitably, the essentially linear polyamide (pre)polymer (X-1) consists of repeat units derived from dicarboxylic acids chosen from adipic acid, terephthalic acid and isophthalic acid, and any mixture thereof and a C2-C12 aliphatic diamine.

The essentially linear polyamide (pre)polymer (X-1) may comprise units derived from other monomers than the monomers A and monomers B. The amount thereof is at most 40 mol %, relative to the total molar amount of monomers A and B. If one would use large amount of other monomers such as lactams, and less AA-BB repeat units, it becomes more difficult to get shear thinning, and the product would also have less good thermal properties.

Preferably the amount is at most 20 mol %, even better at most 10 mol %, and still better in the range of 0-5 mol %, if used at all. Such other monomers can be, for example, αω-amino acids, or their cyclic lactam derivatives thereof (AB monomers), and monofunctional compounds, such as monofunctional amines or monofunctional carboxylic acids. A suitable lactam derivative is for example, caprolactam. In particular the amount of monofunctional compounds, which can act as chain stopper, shall be limited and is preferably at most 0.5 mol % if any, and preferably 0-0.25 mol %.

The essentially linear polyamide (pre)polymer (X-1) used in the process according to the invention may also comprise small amounts of branching units, for example as a result of side reactions during the preparation of the (pre)polymer; however, the amount of such branching units should preferably be kept below 1 mole %, more preferably below 0.5 mole % if any, and most preferably is in the range of 0-0.25 mole %, relative to the total molar amount of monomer A and monomer B (i.e. MA+MB).

The (pre)polymer (X-1) can have a viscosity varying over a wide range. Suitably, (pre)polymer (X-1) has a viscosity number (VN), measured according to ISO 307, of at least 50 mL/g and up to 250 mL/g. Preferred is that the VN of (pre)polymer (X-1) is at least 75, even better at least 150 mL/g.

The viscosity number (VN) according to ISO 307 as mentioned herein for the linear (pre)polymer (X-1) is measured on a polymer solution of polyamide at a concentration of 0.5 gram of polymer in 100 ml of either sulphuric acid 96.00±0.15% m/m or formic acid 90.00±0.05% at 25.00±0.05° C. Formic acid is used for fully aliphatic polyamides. Sulphuric acid is used for polyamides comprising aromatic groups.

The (pre)polymer (X-1) can also have a molecular weight varying over a wide range. Suitably, (pre)polymer (X-1) has a number average molecular weight (Mn) (measured by SEC) in the range of 2.000-40.000 g/mol. Preferred is that the Mn of (pre)polymer (X-1) is at least 5,000 g/mol, even better at least 10,000 g/mol. Still more preferably the Mn of (pre)polymer (X-1) is in the range of 10,000-30,000 g/mol. Herein the Mn is measured in the same way, under the same conditions, as described above for oligomer/prepolymer (Y).

For the polymerization process for preparing the (pre)polymer (X-1) conventional operating conditions of polymerization of dicarboxylic acids and diamines can be applied. Such a polymerization process can comprise briefly: a stirring and heating under pressure of the mixture of monomers in a suitable reaction vessel, such as a pressure reactor or autoclave, maintaining the mixture under pressure and temperature for a fixed period, with removal of water vapour by an appropriate device, decompression and maintenance for a fixed period at a temperature above the melting point of the mixture, including autogenous pressure of water vapour in nitrogen or vacuum, so to continue the polymerization by removal of water formed. It is perfectly possible to add at the beginning, during or after polymerization of conventional additives, such as for example catalysts, such as phosphorus catalysts, anti-foaming agents and stabilizers to light or heat. After the polymerization, the polymer can advantageously be extruded, cooled with water, and then cut to produce pellets. Alternatively, the process can also be performed with a flash step as described above. The polymerization process can be fully realized in a continuous or discontinuous.

The essentially linear polyamide (pre)polymer (X-2), also referred to in abbreviated form as linear (pre)polymer (X-2) used in the polymerization process according to the invention for making the high molecular weight branched polyamide polymer, predominantly consists of AB repeat units. In other words the linear (pre)polymer (X-1) is a polyamide (pre)polymer obtainable by polymerization of a polyamide forming monomer mixture comprising predominantly αω-amino acids, or their cyclic lactam derivatives thereof (AB monomers).

Examples of suitable monomers are, for example, ω-amino-hexanoic acid, or its lactam derivative caprolactam, ω-amino-heptanoic acid, ω-amino-decanoic acid, ω-amino-undecanoic acid, ω-amino-dodecanoic acid. Homopolyamides of these monomers are, respectively PA6, PA7, PA8, PA10, PA11 and PA12. Preferably, the AB repeat comprises, or even consists of caprolactam repeat units. Also preferably, (pre)polymer (X-2) is a homopolymer or copolymer of PA6.

Apart from AB monomers, (pre)polymer (X-2) may comprise repeat units derived from other monomers, such as repeat units derived from diamines and dicarboxylic acids. The diamines and dicarboxylic acids can be the same as described above for the in the monomers A and monomers B in (pre)polymer (X-1) and oligomer/prepolymer (Y), as well as the preferred selections thereof. Suitably, the dicarboxylic acids chosen from adipic acid, terephthalic acid and isophthalic acid, and any mixture thereof and the diamine suitably is a C2-C12 aliphatic diamine.

The essentially linear polyamide (pre)polymer (X-2) may comprise units derived from other monomers than the AB monomers. The amount thereof is at most 20 mol %, relative to the total molar amount of monomers A and B.

Preferably the amount of other monomeric units is at most 10 mol %, even better at most 5 mol %, and still better in the range of 0-5 mol %, if used at all. Such other monomers can also be, for example, monofunctional compounds, such as monofunctional amines or monofunctional carboxylic acids. In particular the amount of monofunctional compounds, which can act as chain stopper, shall be limited and is preferably at most 0.5 mol % if any, and preferably 0-0.25 mol %.

The essentially linear polyamide (pre)polymer (X-2) used in the process according to the invention may also comprise small amounts of branching units, for example as a result of side reactions during the preparation of the (pre)polymer; however, the amount of such branching units should preferably be kept below 1 mole %, more preferably below 0.5 mole % if any, and most preferably is in the range of 0-0.25 mole %, relative to the total molar amount of monomer A and monomer B (i.e. MA+MB).

The (pre)polymer (X-2) can have a viscosity varying over a wide range. Suitably, (pre)polymer (X-2) has a viscosity number (VN), measured according to ISO 307, of at least 50 mL/g and up to 250 mL/g. Preferred is that the VN of (pre) polymer (X-2) is at least 75, even better at least 150 mL/g. Herein the VN is measured in the same way, under the same conditions, as described above for (pre)polymer (X-1).

The (pre)polymer (X-2) can also have a molecular weight varying over a wide range. Suitably, (pre)polymer (X-2) has a number average molecular weight (Mn) (measured by SEC) in the range of 2.000-40.000 g/mol. Preferred is that the Mn of (pre)polymer (X-2) is at least 5,000 g/mol, even better at least 10,000 g/mol. Still more preferably the Mn of (pre)polymer (X-2) is in the range of 10,000-30,000 g/mol. Herein the Mn is measured in the same way, under the same conditions, as described above for oligomer/prepolymer (Y).

For the polymerization process for preparing the (pre)polymer (X-2) conventional operating conditions of polymerization of lactams can be applied. Such a polymerization process can comprise briefly: a stirring and heating under pressure of the mixture of monomers in a suitable reaction vessel, such as a pressure reactor or autoclave, maintaining the mixture under pressure and temperature for a fixed period, with removal of water vapour by an appropriate device, decompression and maintenance for a fixed period at a temperature above the melting point of the mixture, including autogenous pressure of water vapour in nitrogen or vacuum, so to continue the polymerization by removal of water formed. It is perfectly possible to add at the beginning, during or after polymerization of conventional additives, such as for example catalysts, such as phosphorus catalysts, anti-foaming agents and stabilizers to light or heat. After the polymerization, the polymer can advantageously be extruded, cooled with water, and then cut to produce pellets. Alternatively, the process can also be performed with a flash step as described above. The polymerization process can be fully realized in a continuous or discontinuous.

The (pre)polymers (X-1) and (X-2) are thermoplastic materials, and suitably each of these (pre)polymers is a semi-crystalline polyamide having a melting temperature. The melting temperature of (pre)polymer (X-1) will herein be denoted as Tm1, whereas the melting temperature of (pre) polymer (X-2) will herein be denoted as Tm2.

With the term melting temperature is herein understood the temperature, measured according to ASTM D3417-97/ D3418-97 by DSC with a heating rate and cooling rate of 10° C./min, measured in the second heating cycle falling in the melting range and showing the highest melting rate.

Suitably, Tm1 is at least 240° C., preferably at least 260° C., and more preferably at least 280° C. For the higher melting (X-1) (pre)polymers suitably polyamides such as like PA-46, PA6T/66, PA-9T and alike are used.

Also suitably, Tm2 is at most 260° C., preferably at most 240° C., and more preferably at most 230° C. For the lower melting (X-2) (pre)polymers suitably polyamides such as PA-6, PA-11, PA-12, and copolymers thereof and alike are used. Preferably PA-6 is used.

In a preferred embodiment of the present invention, Tm1 is higher than Tm2, more preferably Tm1 is at least 20° C. higher than Tm2, more preferably at least 40° C. higher than Tm2, and still more preferably at least 50° C. higher than Tm2.

The advantage is that the resulting high molecular weight branched polyamide has a better overall balance in mechanical properties at elevated temperature and retention of the mechanical properties upon long term exposure at elevated temperature.

Likewise this is due to the fact that as a result of the process the high molecular weight branched polyamide has a block-like structure comprising blocks of the original (pre)polymers. This is evidenced in the case the melting temperature of the original (pre)polymers is sufficiently different by the observation of two different melting temperatures for the residual blocks of the (pre)polymers.

In a preferred embodiment of the process according to the present invention for preparing a high molecular weight branched polyamide polymer, comprising the melt-mixing step (1) and the solid state post condensation step (2) as described above, for the branched polyamide oligomer/prepolymer (Y) a branched oligomer/prepolymer according to one of the preferred embodiments as described above is used.

The effect of the process according to the invention is that branched polyamide polymer is obtained without the occurrence of gel formation and has a high and relatively stable melt viscosity. The ratio between the essentially linear polyamide (pre)polymers (X-1) and (X-2), and the branched polyamide oligomer/prepolymer (Y) can be varied over a wide range thereby varying the degree of branching of the polymer, without having hardly any effect on the occurrence of gel particles and the stability of the viscosity even upon longer processing times at melt processing temperatures.

The essentially linear (pre)polymer (X-1) used in the process according to the invention can be a blend of different AA-BB (pre)polymers. Analogously, the essentially linear (pre)polymer (X-2) can be a blend of different AB (pre) polymers. Also the branched oligomer/prepolymer (Y) can be a blend of different branched polyamide oligomer/prepolymers.

In the process according to the invention, the essentially linear polyamide (pre)polymers (X-1) and (X-2) may be provided in a weight ratio varying over a wide range. Suitably (X-1) and (X-2) are provided in a weight ratio (X-1)/(X-2) in the range of 0.25-4; preferably 0.5-2; more preferably 0.75-1.35.

The essentially linear (pre)polymers (X-1) and (X-2) and the branched oligomer/prepolymer (Y) may be mixed in a ratio varying over a wide range. Suitably the mixture comprises 75-99 wt. % for the combined amount of (X-1) and (X-2) and 1-25 wt. % (Y), wherein the wt. % are relative to the total weight of (X-1), (X-2) and (Y).

Most conveniently, the amount of branching agent in (Y) is chosen such that the (X-1) and (X-2) and (Y) are mixed ratio wherein (X-1) and (X-2) is present in a combined amount in the range of 90-98 wt. % and (Y) is present in an amount in the range of 2-10 wt. %, relative to the total weight of (X-1), (X-2) and (Y).

Suitably, (X-1), (X-2) and (Y) are mixed in such a ratio that the amount of repeat units derived from the branching monomer (C) in the prepolymer mix comprised by the melt mix resulting after melt-mixing step (1), as well as in the ultimately formed branched polyamide polymer resulting after solid-state post condensation step (2), is in the range of 0.05-1 mole %. Preferably the amount is in the range of 0.1-0.65 mole %, still more preferable 0.2-0.5 mole %, relative to the total molar amount of repeat units in the prepolymer mix, respectively in the branched polyamide polymer. This total amount of repeat units encompasses all repeat units derived from all constituent monomers, i.e. A and B and C monomers and optionally AB monomers in any and all of the prepolymers (X-1), (X-2) and (Y). A higher amount of branching units results in a polyamide polymer with more shear thinning character. A lower amount of branching units has the advantage that the polyamide polymer can be post condensed to even higher molecular weights without the risk of gel formation.

In the process according to the invention, the branched oligomer/prepolymer (Y) is melt mixed together with the essentially linear polyamide (pre)polymers (X-1) and (X-2), and may optionally be compounded at the same time with one or more other ingredients or components (Z). Suitably, this melt-mixing and compounding is done in an extruder, or any other appropriate melt-mixing apparatus. After the melt mixing, the mixed melt so obtained is cooled. Suitably the mixed melt is first extruded into strands, upon which the strands can be cooled cut into granules. The granules can be subjected to solid state post condensation in order to achieve the desired high molar mass/melt viscosity. The melt-mixing, cooling and granulation may also be done otherwise, for example by film extrusion and grinding of the film, thereby obtaining the solid mixture of prepolymers optionally compounded with other ingredients or components in a suitable form for performing the solid state post condensation. The solid state post condensation can be performed by standard procedures known to the person skilled in the art.

Other components that can be included in the polymerization process and can be comprised by the resulting polyamide polymer, are, for example, fillers and fibrous reinforcing agents. To improve the mechanical properties of the composition, it may be advantageous to add at least a filler and/or fibrous reinforcing agent. Such material may well be selected from the group consisting of fibrous such as glass fibres, mineral fillers such as clays, kaolin, and nanoparticles, and powder fillers such as talc. The incorporation rate of a filler and/or fibrous reinforcing agent can be for example a loading rate of 1 to 80 percent, preferably from 10 to 70 percent, especially between 30 and 60 percent. Herein the weight % is relative to the total weight of the composition.

The composition of the invention may further comprise additives commonly used in the manufacture of polyamide compositions intended to be moulded. Such additives include, flame retardants, plasticizers, nucleating agents, catalysts, impact modifiers, stabilizers, such as light stabilizers, heat stabilizers and antioxidants, and processing aids, such as lubricants and demoulding agents. Additives other than fillers and fibrous reinforcing agents are suitably present in a total amount in the range of 0.01-20 wt. %, preferably 0.1-10 wt. %, relative to the total weight of the composition. Preferably, the composition comprises a heat stabilizing system.

These fillers and additives may be added to the polyamide after the completion of the polymerization, but preferably to the mixed melt, so prior the solid state post condensation.

The other components (Z), if present at all, may be present in an amount varying over a large range. Suitably the mixture comprises 0-200 parts by weight (pbw) of other components (Z), relative to 100 pbw of polyamide prepolymer. Herein the amount of polyamide prepolymer is the total amount of (X-1), (X-2) and (Y). For example, impact modifiers are suitably used in an amount of 0-10 wt %, preferably 1-5 wt. %, if used at all.

In a specific embodiment of the polymerization process according to the invention, the components are mixed in the following ratio
(A) 75-99 wt. % of essentially linear polyamide (pre)polymers (X-1) and (X-2) and
(B) 1-25 wt. % of branched polyamide oligomer/prepolymer (Y),
wherein the wt. % is relative to the total weight of (X-1), (X-2) and (Y), and
(C) 0-200 pbw (parts by weight) of other components Z, relative to 100 pbw of the combined weight of polyamide prepolymers (X-1), (X-2) and (Y).

The high molecular weight branched polyamide polymer obtained in the process according to the invention after the solid state post condensation suitably has a relative viscosity (RV) measured according to ISO 307 of at least 2.5. Preferred is that the RV is in the range of 3-5, more preferred 3.5-4.2. The advantage is that the resulting polymer has sufficient melt strength for use in suction blow moulding.

The relative viscosity (RV) according to ISO 307, mentioned herein is determined on a solution of polyamide at a concentration of 1 gram of polymer in 100 ml of either sulphuric acid 96.00±0.15% m/m or formic acid 90.00±0.05% at 25.00±0.05° C., and calculated by the Huggins method. Formic acid is used for fully aliphatic polyamides. Sulphuric acid is used for polyamides comprising aromatic groups.

The modified branched polyamide according to the invention preferably has a viscosity number (VN) between 150 and 300, according to ISO 307, especially between 160 and 250.

Herein the viscosity number (VN) according to ISO 307 as mentioned herein for the high molecular weight branched polymer is measured on a polymer solution of polyamide at a concentration of 0.5 gram of polymer in 100 ml of either sulphuric acid 96.00±0.15% m/m or formic acid 90.00±0.05% at 25.00±0.05° C. Formic acid is used for fully aliphatic polyamides. Sulphuric acid is used for polyamides comprising aromatic groups.

The present invention also relates to a high molecular weight branched polyamide polymer, more particularly the high molecular weight branched polyamide polymer obtained or obtainable by the process, and the preferred embodiments thereof, described above.

The high molecular weight branched polyamide polymer according to the invention has a relative viscosity (RV) measured according to ISO 307 of at least 2.5, and preferably 3-5, and comprises
(A) blocks predominantly consisting of AA-BB repeat units,
(B) blocks predominantly consisting of AB repeat units, and
(C) branching units derivable from a monomer (referred to as monomer C) having at least three functional groups being either amino groups and/or carboxylic acid functional groups or precursor groups thereof,
wherein the branching units derivable from monomer C are present in an amount of 0.05-1 mole % relative to the total molar amount of AA-repeat units, BB-repeat units, AB repeat units and the branching units.

As described above AA repeat units are derivable from diamines, BB units are derivable from dicarboxylic acids and precursors thereof, AB repeat units are derivable from α,ω-amino acids and their lactam derivatives, and branching units are derivable from multifunctional having at least three functional groups being either amino groups and/or carboxylic acid functional groups or precursor groups thereof.

In case for each of the (pre)polymers (X-1) and (X-2) used in the process for the preparation of the high molecular weight branched polyamide a semi-crystalline polyamide is used, one with melting temperature Tm1 and the other with melting temperature Tm2, and Tm1 and Tm2 being sufficiently different, the high molecular weight branched polyamide shows 2 melting temperatures, herein denoted as T1 and T2. Moreover, these 2 melting temperatures do not differ much from those of the origination melting temperature Tm1 and Tm2.

These results are indicative that during the process the block structure of the prepolymers is retained by large.

Advantageously the melting temperatures T1 is higher than T2, more preferably T1 is at least 20° C. higher than T2, more preferably at least 40° C. higher than T2, and still more preferably at least 50° C. higher than T2.

Suitable the branching units in the high molecular weight branched polyamide polymer wherein are present in an amount of 0.05-1 mole %, more preferably 0.1-0.65 mole %, still more preferable 0.2-0.5 mole %, relative to the total molar amount of the AA, BB and AB repeat units and the branching units.

Also suitably, the high molecular weight branched polyamide polymer has a relative viscosity (RV) measured according to ISO 307 of at least 2.5, preferably in the range of 3-5, more preferably 3.5-4.2.

The relative viscosity (RV) according to ISO 307, mentioned herein is determined on a solution of polyamide at a concentration of 1 gram of polymer in 100 ml of either sulphuric acid 96.00±0.15% m/m or formic acid 90.00±0.05% at 25.00±0.05° C., and calculated by the Huggins method.

Formic acid is used for fully aliphatic polyamides. Sulphuric acid is used for polyamides comprising aromatic groups.

The branched polyamide polymer suitably has a number of amino functional end groups (EG-A) in the range of 5-40 meq/kg, a number of carboxyl functional end groups (EG-B) in the range of 5-40 meq/kg and a difference between the number of amino functional end groups and the number of carboxyl functional end groups [EG-A–EG-B], expressed in absolute value, in the range of 0-35 meq/kg.

As explained above, the branched polyamide polymer prepared by the process according to the invention can be prepared with a small difference in end-groups, i.e. being in balance in end groups, or about so, and still have good blow moulding properties.

In particular, the branched polyamide polymer suitably has a number of the amino functional end groups (EG-A) in the range of 8-30 meq/kg, and even better 10-20 meq/kg), a number of carboxyl functional end groups (EG-B) in the range of 8-30 meq/kg, and even better 10-20 meq/kg) and a difference [EA–EB], expressed in the absolute number, in the range of 0-22 meq/kg, even better 0-10 meq/kg).

The invention also relates to a polymer composition comprising the high molecular weight branched polyamide polymer and at least one other component.

The polymer composition according to the invention consists of
(I) the high molecular weight branched polyamide polymer described above and optionally
(II) one or more other components in an amount of 0-200 pbw of relative to 100 pbw of the high molecular weight branched polyamide polymer (I).

The invention also relates to use of the branched polyamide polymer according to the invention, as well the composition comprising said polymer, in an extrusion or suction blow moulding process for the production of an extrusion moulded part or a suction blow moulded part, as well as to such an extrusion or suction blow moulding process for the preparation of hollow moulding articles. The said process comprises an extrusion step or a suction blow moulding step wherein a high molecular weight branched polyamide polymer or composition as described here above is melt processed and shaped into the shape of a hollow moulding article.

The invention also relates to all articles produced using this branched polyamide polymer or composition and process and articles made of the branched polyamide polymer, more particular an extrusion moulded part or a suction blow moulded part.

The invention is further illustrated with the following examples and comparative experiments.

Methods

Viscosity

The viscosity number (VN) according to ISO 307 for the branched prepolymers was measured on a polymer solution of polyamide at a concentration of 5 gram of polymer in 100 ml of either sulphuric acid 96.00±0.15% m/m or formic acid 90.00±0.05% at 25.00±0.05° C.

The viscosity number (VN) according to ISO 307 for the linear (pre)polymers and the high molecular weight branched polymers was measured on a polymer solution of polyamide at a concentration of 0.5 gram of polymer in 100 ml of either sulphuric acid 96.00±0.15% m/m or formic acid 90.00±0.05% at 25.00±0.05° C.

The relative viscosity (RV) according to ISO 307 for the high molecular polyamide in the compounded and post condensed compositions was determined on a solution of polyamide at a concentration of 1 gram of polymer in 100 ml of either sulphuric acid 96.00±0.15% m/m or formic acid 90.00±0.05% at 25.00±0.05° C., and calculated by the Huggins method.

Formic acid is used for fully aliphatic polyamides. Sulphuric acid is used for polyamides comprising aromatic groups.

Mechanical Properties

Dried granulate was injection moulded in a mould to form test bars conforming ISO 527 type 1A and having a thickness of 4 mm, using standard injection moulding conditions. The mechanical properties (tensile modulus [MPa], tensile strength [MPa], elongation at break [%]) were measured in a tensile test according to ISO 527 at 23° C.

Thermal Properties/Heat Ageing Performance

Dried granulate was injection moulded in a mould to form test bars conforming ISO 527 type 1A and having a thickness of 4 mm, using standard injection moulding conditions. Thermal properties were determined in terms of retention of mechanical properties after ageing of the test bars for several hundreds of hours at a temperature of 210° C. and tested in a tensile test according to ISO 527 at 23° C.

Sagging and Stability

Sagging and stability were tested in a Rheograph 6000 test setup, comprising a piston and a capillary l/d 50/3 (mm) a pressure transducer (max 500 bar), a thermocouple and a video-recording system. The test samples were dried at 95° C., and applying vacuum and N2 flush for 36-48 hrs. Prior to the measurements the materials were pre-heated. The heating time before actually starting the measurements was 8 minutes. The time scale applied for the "sagging time" excludes pre-heating time. The time scale applied for the "stability-graph" includes pre-heating time.

The actual measurements were performed with a constant piston speed such as to provide a shear rate of $2.1\ s^{-1}$.

Sagging Measurement.

Extrusion by moving of the piston was started after 7 minutes pre heating time. At 8 minutes the initial extrudate was cut of. At that moment the measurement was started. With the help of the video-recording system the time needed for the extrudate to reach a distance of 2, 4, 6, 8, 10, 12, 14, 16, 18, and 20 from the exit of the capillary was measured. By visual observation the a time needed for the extrudate to reach a distance of 78.5 cm from the exit of the capillary was measured measured.

Stability Measurement.

During the sagging measurement the pressure was recorded from which the (apparent) viscosity can be calculated and the stability can be determined. The pressure, respectively the (apparent) viscosity was reported at 8, 10, 12, 14, 16, 18 and 20 minutes, which time includes the pre heating time.

Materials

For (pre)polymer (X-1) a low Mw PA46 (VN 15±0.5 ml/g) and for (pre)polymer (X-2) medium Mw PA6 (VN 164 ml/g) was used. In one comparative experiment a PA46/6 (95/5 wt./wt. copolymer was used with a (VN 15±0.5 ml/g).

Furthermore, standard glass fibres for polyamide compositions and an additive package comprising heat stabilizer system was applied.

PREPOLYMER SYNTHESIS

Example IA-ID

Branched prepolymer were prepared from 1,4-diaminobutane (DAB), adipic acid (AA) and bis(hexamethyene)triamine (BHT) with varying BHT content using the following procedure: In an autoclave, a 70% salt solution of DAB and AA with 0.92 wt % excess DAB with respect to the 4,6 salt is prepared with 3.5 mole % BHT. This salt solution is heated and distilled to 90% salt concentration. The prepolymerization was started at 204° C. in a closed system for one hour and then the reactor contents were flashed to get solid prepolymer (Example IA).

For the Examples IB-ID different molar amounts for 1,4-diaminobutane (DAB), adipic acid (AA) and bis(hexamethyene)triamine (BHT) were used. The composition, the corresponding Q and R values and the properties if the prepolymers have been collected in Table 1.

TABLE I

Composition and results for Examples IA-ID

| Examples | DAB (mole %) | AdAc (mole %) | BHT (mole %) | Q | R | EG-A (meq/kg) | EG-B (meq/kg) | VN (ml/g) |
|---|---|---|---|---|---|---|---|---|
| EX-IA | 45.7 | 49.3 | 5.0 | 0.16 | 1.08 | 1164 | 1050 | 19.1 |
| EX-IB | 38.8 | 51.2 | 10.0 | 0.33 | 1.05 | 1235 | 1215 | 19.5 |
| EX-IC | 27.3 | 54.5 | 18.2 | 0.67 | 1.00 | 1634 | 1634 | 18.7 |
| EX-ID | 17.6 | 57.4 | 25.0 | 1.00 | 0.96 | 1634 | 1692 | 18.7 |

The product of Example IB had a melting temperature of about 260° C.

POLYMER SYNTHESIS

Examples II-V and Comparative Examples A-E

Branched polymers were prepared using a blend of PA46 (pre)polymer and a PA6 (pre)polymer and branched oligomer/prepolymer from Example I in different combinations and ratios. The compositions are listed in Table 2, further below.

Compounding

The branched oligomer/prepolymer obtained as described above and the other, linear (pre)polymers were dried at 40° C. for 16 hours under vacuum of 100 mbar. The oligomer/prepolymers were melt-mixed compounded together with the linear (pre)polymers, glass fibres and other additives in an extruder to get a homogeneous mixture of all ingredients. The processing temperature was 310° C. and the average residence time in the extruder was less than 2 minutes. The composition of the blends is listed in Table 2.

Post Condensation

The blends obtained in the compounding step were post condensed at 190° C. to obtain a product with a desirable relative solution viscosity. The post condensation was performed in an SSPC column equipped with a heating mantle and inlet for nitrogen at the bottom of the column and outlet at the top of the column.

The composition of the resulting branched polymers and the properties measured have been collected in Table 2. Herein the mole percentage of branching monomer (X-unit) is calculated as mole % X-unit in the prepolymer, multiplied by the weight ratio Prepol/Total polymer content.

TABLE II

Composition and results for Examples II-V and comparative experiments A-D

| Examples | EX-II | EX-III | EX-IV | EX-V | CE-A | CE-B | CE-C | CE-D | CE-E | CE-F |
|---|---|---|---|---|---|---|---|---|---|---|
| Ingredients (wt, %) | | | | | | | | | | |
| Prepol IA (5 mole % X) | | | 6.84 | | | | | | | |
| Prepol IB (10 mole % X) | 2.28 | 1.72 | | | 2.28 | 2.28 | 2.28 | 2.28 | | |
| Prepol IC (18.2 mole % X) | | | | 0.95 | | | | | | |
| Prepol ID (25 mole % X) | | | | | | | | | 0.91 | |
| BHT | | | | | | | | | | 0.228 |
| PA46 | 33.36 | 33.64 | 22.16 | 51 | 60.6 | 66.72 | 0 | | 34.04 | 34.4 |
| PA6 | 33.36 | 33.64 | 40 | 17.05 | 6.12 | | 66.72 | | 34.04 | 34.4 |
| PA6/46 | | | | | | | | 66.72 | | |
| Glass Fibres | 30 | 30 | 30 | 30 | 30 | 30 | 30 | 30 | 30 | 30 |
| Additive package | 1 | 1 | 1 | 1 | 1 | 1 | 1 | 1 | 1 | 1 |
| Mole % X-unit | 0.33 | 0.25 | 0.5 | 0.25 | 0.33 | 0.33 | 0.33 | 0.33 | 0.33 | 0.33 |
| Performance | | | | | | | | | | |
| RV | 4 | 4 | 4.3 | 3.5 | 3.8 | 3.9 | 3.5 | 3.8 | Gel | Gel |
| Sagging behaviour | Good | Good | Good+ | Good− | Moderate | Bad | Moderate | Moderate | n.a. | n.a. |
| Blow moldability | Good | Good | Good+ | Good− | Marginal | Bad | Moderate | Moderate | n.a. | n.a. |

TABLE II-continued

Composition and results for Examples II-V and comparative experiments A-D

| Examples | EX-II | EX-III | EX-IV | EX-V | CE-A | CE-B | CE-C | CE-D | CE-E | CE-F |
|---|---|---|---|---|---|---|---|---|---|---|
| Mechanical Properties | Good | Good | Good | Good | n.a. | n.a. | Moderate | Marginal | n.a | n.a. |
| Thermal Properties | Good | Good | Good | Good | n.a. | n.a. | Bad | Marginal | n.a | n.a. |

For some of the products according to the Comparative Experiments, it was difficult or impossible to produce good testing samples, or even to measure the sagging behaviour and blow moldability. This is indicated in the table with the abbreviation n.m. (not measurable). For the products of the Examples according to the invention the results were good, some were slightly better than average (indicated as Good+), some were slightly less than average (indicated as Good−).

The products according to the invention (Examples II-V) showed good properties both in terms of moulding behaviour (sagging and blow moulding) as well in mechanical properties and retention thereof upon heat treatment. The comparative experiments showed a less good moulding behaviour and/or were less good in mechanical and thermal properties.

The products according to the invention (Examples II-V) showed retention of the block structure, as is illustrated, for example, with the DSM measurements on the material of Example I, which showed a melting peak at about 213° C., with a melting enthalpy of about 23 J/g, and a melting peak at about 283° C., with a melting enthalpy of about 37 J/g. The first peak is considered representative for the PA6 blocks and the second peak is considered representative for the PA46 blocks.

The invention claimed is:

1. A process for the preparation of a high molecular weight branched polyamide comprising the steps of:
   (1) a melt-mixing step which comprises providing (i) a linear polyamide (pre)polymer (X-1) consisting essentially of AA-BB repeat units, (ii) a linear polyamide (pre)polymer (X-2) consisting essentially of AB repeat units, and (iii) a branching agent, to a melt mixing apparatus and mixing and heating components (i)-(iii) in the melt-mixing apparatus thereby forming a mixed melt, and thereafter cooling the mixed melt to thereby form a solid mixture; and
   (2) a solid state post condensation step which comprises subjecting the solid mixture to post-condensation at elevated temperature in the solid state, thereby forming a high molecular weight branched polyamide, wherein the (pre)polymers (X-1) and (X-2) are provided in a weight ratio (X-1)/(X-2) in a range of 0.25-4;
   the (pre)polymer (X-1) and/or the (pre)polymer (X-2) have a viscosity number (VN), measured according to ISO 307, in a range of 50-250 mL/g;
   the branching agent is a branched polyamide oligomer/prepolymer (Y) comprising (a) a branching unit formed from a monomer C having at least three functional groups, wherein the at least three functional groups may be the same or different and are selected from the group consisting of amino groups, carboxylic acid functional groups and alkyl ester or acid chloride derivatives thereof, and (b) AA-BB repeat units and/or AB repeat units;
   the branching unit is present in an amount in a range of 0.05-1 mole %, relative to the total molar amount of AA repeat units, BB repeat units and AB repeat units of the (pre)polymers (X-1) and (X-2) and the branched polyamide oligomer/prepolymer (Y);
   the high molecular weight branched polyamide obtained after the solid state post condensation step has a relative viscosity (RV) measured according to ISO 307 of at least 2.5, and
   the AA repeat units represent units derived from a diamine monomer A, the BB repeat units represent units derived from a dicarboxylic monomer B and the AB repeat units represent units derived from an $\alpha,\omega$-amino acid or a cyclic lactam derivative thereof.

2. The process according to claim 1, wherein the weight ratio (X-1)/(X-2) is in the range of 0.5-2.

3. The process according to claim 1, wherein the polyamide oligomer/prepolymer (Y) consists essentially of AA-BB repeat units and branching units.

4. The process according to claim 1, wherein the branched polyamide oligomer/prepolymer (Y) is a branched polyamide oligomer/prepolymer having repeat units, wherein the branched polyamide oligomer/prepolymer (Y) is a polymerization reaction product of a polyamide forming monomer mixture comprising:
   (A) a first monomer which is the diamine monomer A and/or a salt of the diamine monomer A, wherein the diamine monomer A has two amino functional groups, and
   (B) a second monomer which is the dicarboxylic monomer B and/or a salt of the dicarboxylic monomer B, wherein the dicarboxylic monomer B has two functional groups selected from the group consisting of carboxylic acid functional groups and alkyl ester or acid chloride derivatives thereof, and
   (C) a third monomer which is the monomer C, wherein repeat units are present in a molar amount according to Formula I and Formula II:

$$Q=(MC*FC)/(MA+MB) \quad \text{(Formula I)}$$

and $$R=((MA*2)+(MC*FCA))/((MB*2)+(MC*FCB)) \quad \text{(Formula II)}$$

wherein
   MA, MB and MC represent the molar amounts of repeat units derived from the monomers A, B and C, respectively;
   FC represent the functionality of monomer C, and is equal to FC-A+FC-B;
   FC-A is the number of the amino functional groups comprised by monomer C;
   FC-B is the number of carboxylic acid functional groups and the alkyl ester or acid chloride derivatives thereof comprised by monomer C;
   Q is a number in the range of 0.06-1.00; and
   R is a number in the range of 0.7-1.3; and wherein
   the polyamide oligomer/prepolymer has a viscosity number (VN), measured according to ISO 307, in the range of 7-30 mL/g.

5. The process according to claim 1, wherein the branched oligomer/prepolymer (Y) has a number average molecular weight (Mn) measured by Size Exclusion Chromatography (SEC) in a range of 600-3500 g/mol.

6. The process according to claim 1, wherein the branched oligomer/prepolymer (Y) has carboxylic acid functional end groups (CFE) and amino functional end groups (AFE), and wherein the ratio between the number of the carboxyl functional end groups (N-CFE) and the number of the amino functional end groups (N-AFE) in the oligomer/prepolymer is in a range of 0.5-2.0.

7. The process according to claim 1, wherein the components are mixed in the following amounts:

75-99 wt. % of the linear polyamide (pre)polymers (X-1) and (X-2), and 1-25 wt. % of the branched polyamide oligomer/prepolymer (Y), wherein the weight percentages (wt. %) are relative to the total weight of (X-1), (X-2) and (Y).

8. The process according to claim 1, wherein the melt-mixing step (1) comprises melt-mixing the polyamide (pre)polymer (X-1), the polyamide (pre)polymer (X-2) and the branching agent in the melt mixing apparatus together with one or more other components.

9. The process according to claim 1, wherein the weight ratio (X-1)/(X-2) is in the range of 0.75-1.35.

10. The process according to claim 1, wherein the monomer C is at least one monomer selected from the group of monomers consisting of (i) a monomer having at least three amine groups, (ii) a monomer having at least three carboxylic acid functional groups or alkyl ester or acid chloride derivatives of carboxylic acid functional groups, (iii) a monomer having at least one amine group and at least two carboxylic acid functional groups or alkyl ester or acid chloride derivatives of carboxylic acid functional groups, and (iv) a monomer having at least two amine groups and at least one carboxylic acid functional group or an alkyl ester or an acid chloride derivative of a carboxylic acid functional group.

* * * * *